United States Patent [19]

Sirjola

[11] Patent Number: 5,477,121
[45] Date of Patent: Dec. 19, 1995

[54] PROCEDURE AND APPARATUS FOR COMPENSATING THE SLIP OF AN INDUCTION MACHINE

[75] Inventor: Juhani Sirjola, Hyvinkää, Finland

[73] Assignee: KCI Konecranes International Corporation, Hyvinkaa, Finland

[21] Appl. No.: 164,696

[22] Filed: Dec. 9, 1993

[30] Foreign Application Priority Data

Dec. 16, 1992 [FI] Finland .................................... 925710

[51] Int. Cl.$^6$ ........................................................ H02P 7/00
[52] U.S. Cl. .......................................... 318/799; 318/807
[58] Field of Search ................................. 318/798–815, 318/432, 632, 52

[56] References Cited

U.S. PATENT DOCUMENTS

| | | |
|---|---|---|
| 3,887,853 | 6/1975 | Klein et al. . |
| 4,044,285 | 8/1977 | Plunkett et al. .......................... 318/801 |
| 4,358,726 | 11/1982 | Iwakane et al. ..................... 318/806 X |
| 4,437,051 | 3/1984 | Muto et al. ............................. 318/808 |
| 4,459,533 | 7/1984 | Ehret et al. . |
| 4,459,534 | 7/1984 | Nagase et al. .......................... 318/808 |
| 4,503,375 | 3/1985 | Okuyama ................................ 318/802 |
| 4,524,310 | 6/1985 | Nagase et al. .......................... 318/808 |
| 4,751,447 | 6/1988 | Okachi ................................. 318/800 X |
| 5,231,339 | 7/1993 | Kishimoto et al. ...................... 318/807 |

FOREIGN PATENT DOCUMENTS

| | | |
|---|---|---|
| 2120193 | 11/1972 | Germany . |
| 341425 | 12/1971 | Sweden . |

OTHER PUBLICATIONS

Patent Abstracts of Japan, vol. 10, No. 255 (E–433) (2311), Sep. 2, 1986 & JP-A-61 081 152 (Toshiba Corp.) Apr. 24, 1986—Abstract.

*Primary Examiner*—Jonathan Wysocki

[57] ABSTRACT

The invention relates to a procedure and an apparatus for adjusting the speed of an induction machine (1) fed by a frequency converter or an inverter (2) to a value corresponding to a reference value ($f_R$). In the procedure, a frequency signal ($n_m$) depending on the actual speed of the motor is generated and the reference value ($f_R$) Of the motor speed is corrected by means of a correction signal (C) proportional to the slip of the motor. The corrected reference value is used as a frequency reference ($f_S$) for the frequency converter or inverter. According to the invention, the correction signal (C) proportional to the slip is generated with the aid of the frequency signal ($n_m$) depending on the actual motor speed and another frequency signal ($n_s'$) formed from the frequency reference ($f_s$) of the inverter. When the motor speed changes, e.g. due to variation in the load, the reference frequency of the inverter is corrected correspondingly.

19 Claims, 3 Drawing Sheets

5,477,121

PROCEDURE AND APPARATUS FOR COMPENSATING THE SLIP OF AN INDUCTION MACHINE

The invention relates to a procedure and to an apparatus for compensating the slip of an induction machine.

BACKGROUND OF THE INVENTION

The speed of rotation of an induction machine deviates from the frequency of the supplying network in a known manner by a certain slip. When operated as a motor, the speed of rotation is somewhat lower than the supplying frequency divided by the number of pole pairs, i.e. the synchronous speed in motor operation and, correspondingly, the speed of rotation in generator operation is somewhat higher than the network frequency divided by the number of pole pairs. The magnitude of the slip depends on the load of the machine, which is why adjusting the speed of rotation often leads to a complicated control system, because the variable quantities cannot always be measured accurately. For this reason, it is difficult to maintain a constant speed of rotation of an induction machine, especially when the load varies.

There are several previously known control systems for adjusting the speed of rotation of an asynchronous motor to a level corresponding to a reference value. These solutions have often led to the use of complicated and expensive regulating apparatuses which could seldom be realized in the case of small motors. Besides, the proposed apparatuses have required the measurement of the speed of rotation directly from the motor shaft or the measurement of the load current of the motor.

SUMMARY OF THE INVENTION

The object of the invention is to achieve a new method for regulating the speed of rotation of an induction machine by suitably compensating in a control loop the deviation caused by the slip between the supplying frequency and the actual and reference values of the speed of rotation.

The present invention makes it possible to achieve an advantageous and reliable system for controlling the speed of rotation of an induction machine. The motor speed can be determined e.g. using a simple inductive detector without a separate tachometer or optic pulse sensor mounted on the motor shaft. Especially in cases where the axial length of the motor is limited, this provides a considerable advantage. In the system of the invention, the slip is compensated digitally via speed feedback, resulting in fast and accurate operation. The feedback is implemented using a few cheap integrated circuits.

BRIEF DESCRIPTION OF THE DRAWINGS

In the following, the invention is described by the aid of the drawings, in which.

DESCRIPTION OF THE PREFERRED EMBODIMENTS

Figure 1:
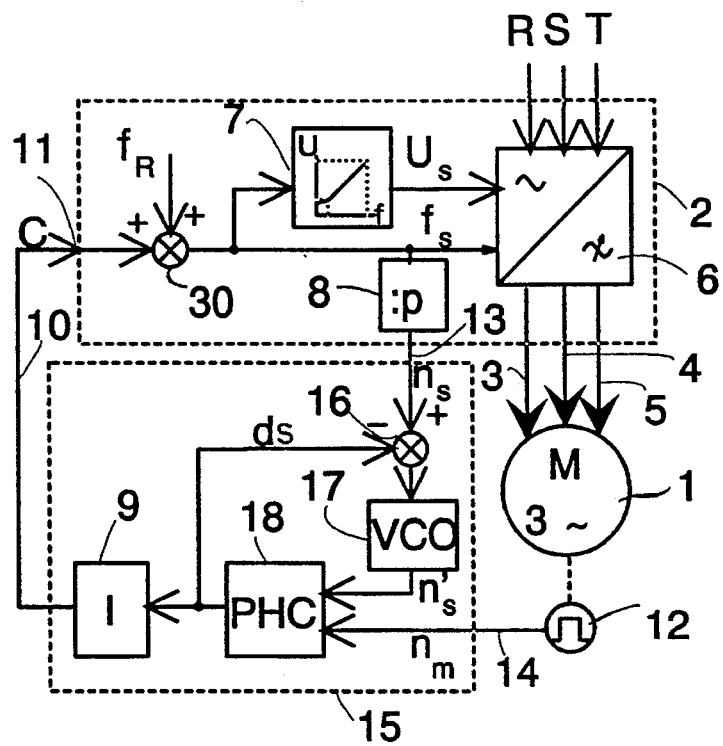
FIG. 1 presents a block diagram of the control system of the invention.

FIG. 1 illustrates the system of the invention for the compensation of the slip of an asynchronous motor. A three-phase asynchronous motor 1 is fed through conductors 3, 4 and 5 by a frequency converter 2, which converts the constant-frequency voltage of the supply network connected to its input terminals R, S and T into a motor supply voltage determined by the control, the frequency and voltage of which are adjustable. The frequency converter 2 consists e.g. of a PWM converter 6 and a controller 7 which generates a reference voltage $u_s$ and a reference frequency $f_s$ for it The structure and operation of the motor 1 and the frequency converter 2 controlling it are previously known systems in the art and their details are irrelevant to the implementation of the present invention.

The speed reference $f_R$ for the motor 1 is connected to the reference input of the frequency converter 2 or it is generated within the frequency converter in accordance with external control. The signal C compensating the slip of the asynchronous motor is passed via conductor 10 to the control terminal 11 of the frequency converter so that it is summed with the speed reference $f_R'$ producing a reference frequency $f_s$. The system controlling the frequency converter determines, in a manner known in itself, the magnitude of the motor supply voltage on the basis of the frequency reference. The motor speed is measured by means of a pulse sensor 12, which outputs a frequency signal $n_m$ proportional to the speed of rotation of the motor. The pulse sensor 12 is preferably implemented by providing the motor with an inductive sensor responding to the brake wheel toothing, the cooling ribs of the rotor or e.g. to the fan blades. Thus, no separate tachometer or optic sensor is needed. The frequency reference $f_s$ of the frequency converter is divided by the number of pole pairs p by a divider 8, and the signal $n_s$ obtained from the divider, which is proportional to the synchronous speed of the motor, and the frequency signal $n_m$ obtained from the pulse sensor, which is proportional to the speed, are passed to the slip compensator 15 via conductors 13 and 14. The output C of the slip compensator 15 is applied to the input of the frequency converter 2 as described above. The frequency converter 2, the motor 1 and the speed detector 12 measuring the speed of rotation constitute the outer control loop of the system of the invention, controlling the speed of the motor.

The slip compensator 15 consists of a summing element 16, a voltage/frequency converter ]7, a phase comparator 18 and an integrator 9. The frequency signal $n_m$ obtained from the pulse sensor 12 is passed via conductor 14 to one of the inputs of the phase comparator 18. The synchronous speed $n_s$ is obtained as a voltage signal from the frequency converter 2 and passed to the summing element 16, which subtracts from its value the signal ds given by the phase comparator 18. The output signal of the summing element 16 is passed to the voltage/frequency converter 17, which forms a frequency signal $n_s'$ corresponding to the reference speed $f_R$ of the motor. The phase comparator 18 forms a phase difference signal ds on the basis of the phase difference between its input signals $n_m$ and $n_s'$ in the manner illustrated by FIG. 3. The phase difference signal ds is conveyed to the summing element 16 and to the integrator 9, which generates from the phase difference signal ds a correction signal C, which is applied to the correcting reference input 11 of the frequency converter 2. The summing element 16, the voltage-controlled oscillator 17 and the phase comparator 18 constitute the inner loop of the control system, which is structured as a so-called phase-locked loop.

The speed control system of the invention works as follows. The signal $n_s$ obtained from the frequency converter 2 is proportional to the output frequency of the frequency converter and to the synchronous speed of the motor. The voltage-controlled oscillator 17 produces a frequency signal $n_s'$ proportional to the reference speed of the motor. The pulse sensor 12 produces a pulse train $n_m$ of a frequency proportional to the speed of rotation of the motor 1. The phase comparator 18 compares the pulse trains of signals $n_s'$ and $n_m$. As a result of this comparison, the phase difference signal ds increases if the pulses received from the motor are retarded. The phase difference signal ds is subtracted from signal $n_s$, causing the output frequency $n_s'$ of the oscillator 17 to fall and the oscillator to be synchronized with the frequency $n_m$ obtained from the pulse sensor. The mean value of the phase difference signal causing the synchronization is proportional to the difference between the synchronous speed and the speed of rotation of the motor, i.e. to the slip. The integrator 9 generates the correction signal C by filtering the phase difference signal ds. When the correction signal C is added to the original frequency reference $f_R$, a closed speed control circuit is formed which determines the slip of the motor and corrects its supply frequency correspondingly. Thus, the static state speed of the motor is not dependent on the load but is adjusted to a value corresponding to the reference frequency $f_R$ as long as the motor is able to generate a torque corresponding to the load.

Figure 2:
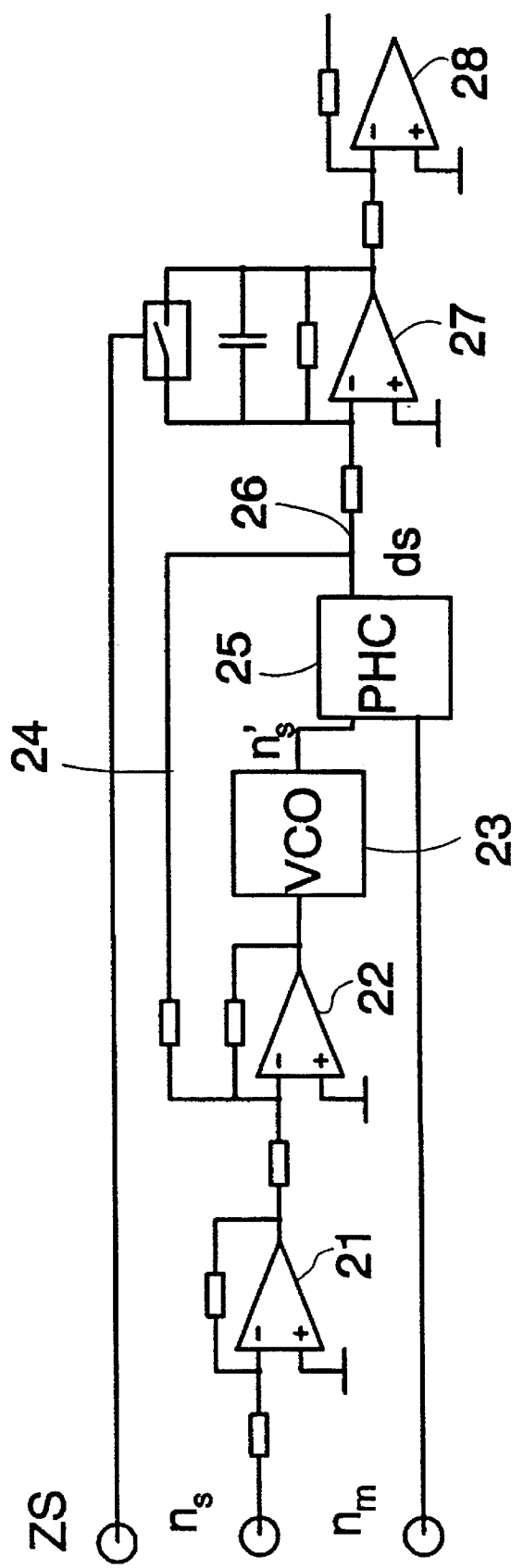
FIG. 2 presents the circuit implementing the compensation.

FIG. 2 presents a circuit designed to perform the function of the slip compensator shown in FIG. 1. The voltage signal $n_s$ (0 . . . 10 V) proportional to the motor supply frequency $f_s$ is taken through amplifiers 21 and 22 to the voltage-controlled oscillator 23. Via conductor 24, a phase difference signal corresponding to the slip is applied to the summing point at amplifier 22, which subtracts it from the signal $n_s$. The oscillator 23 produces at its output a frequency signal $n_s'$ proportional to the reference speed, which is passed to the phase comparator 25. The signal $n_m$ obtained from the pulse sensor connected to the motor is applied to the other input of the phase comparator. The output 26 of the phase comparator 25 is passed to an integrator 27 acting as a filter, whose output gives the correction signal C via amplifier 28. The signal ZS keeps the integrator output at zero when the machine has been stopped. The phase comparator 25 controls the input of the integrator 27 on the basis of the phase difference between the frequency signals $n_s'$ and $n_m$ so that the integrator output increases when the pulse of signal $n_m$ lags behind the pulse of signal $n_s'$.

Figure 3:
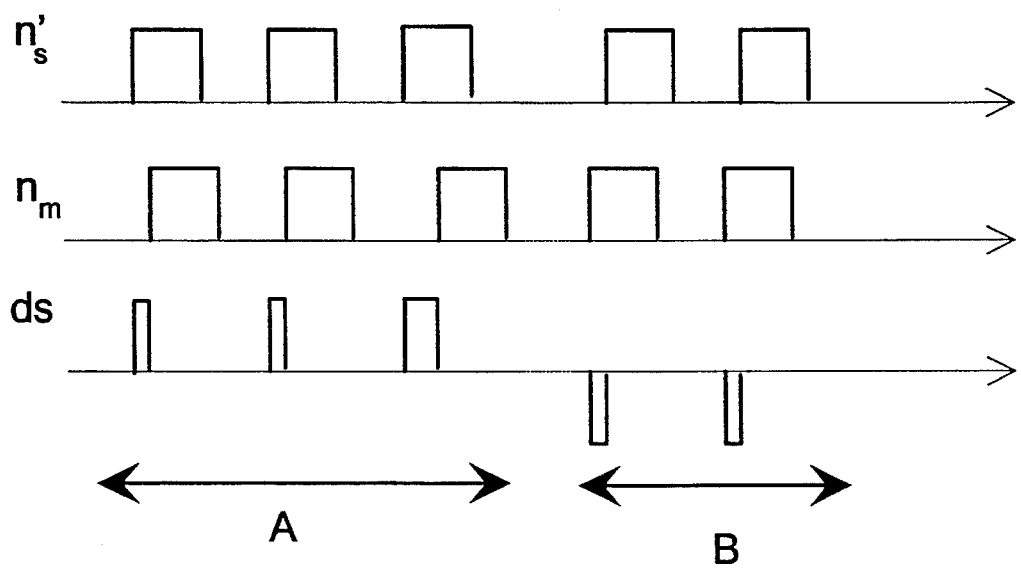
FIG. 3 presents the pulse shapes of the signals.

FIG. 3 represents the input and output pulses of the phase comparator. The pulse sensor produces e.g. 24 pulses per revolution, in which case a motor speed of 1800 r/min corresponds to a pulse frequency of 720 Hz. The phase comparator is implemented using a CMOS circuit with a three-state output. In the area indicated by arrow A, signal $n_s'$ causes the differential signal ds to go into the state +1, and signal $n_m$ causes ds to return into the 0-state. As the phase difference increases, the pulse duration of ds also increases. Similarly, if the motor speed tends to increase, the pulse of signal nm causes ds to change into the -1-state and the pulse of signal ns' back into the 0-state as is illustrated by the area indicated by arrow B.

Figure 4B:
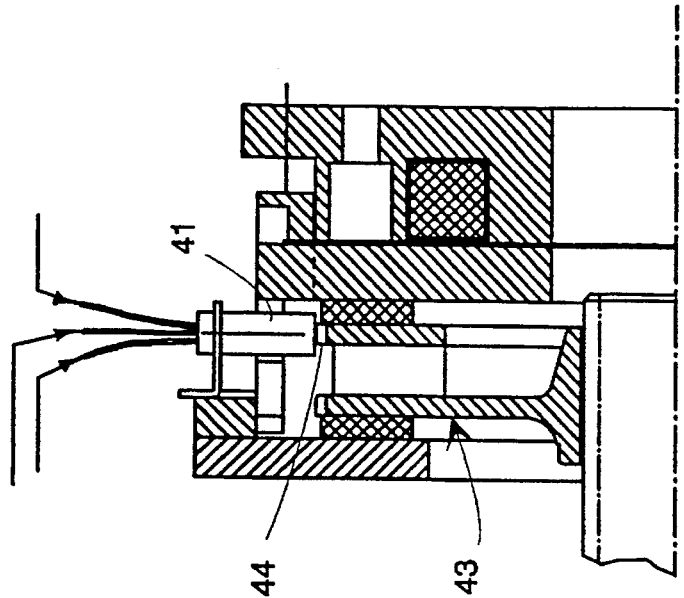
FIGS. 4a and 4b illustrate the arrangements for the measurement of the speed of rotation of the motor.
Figure 4A:
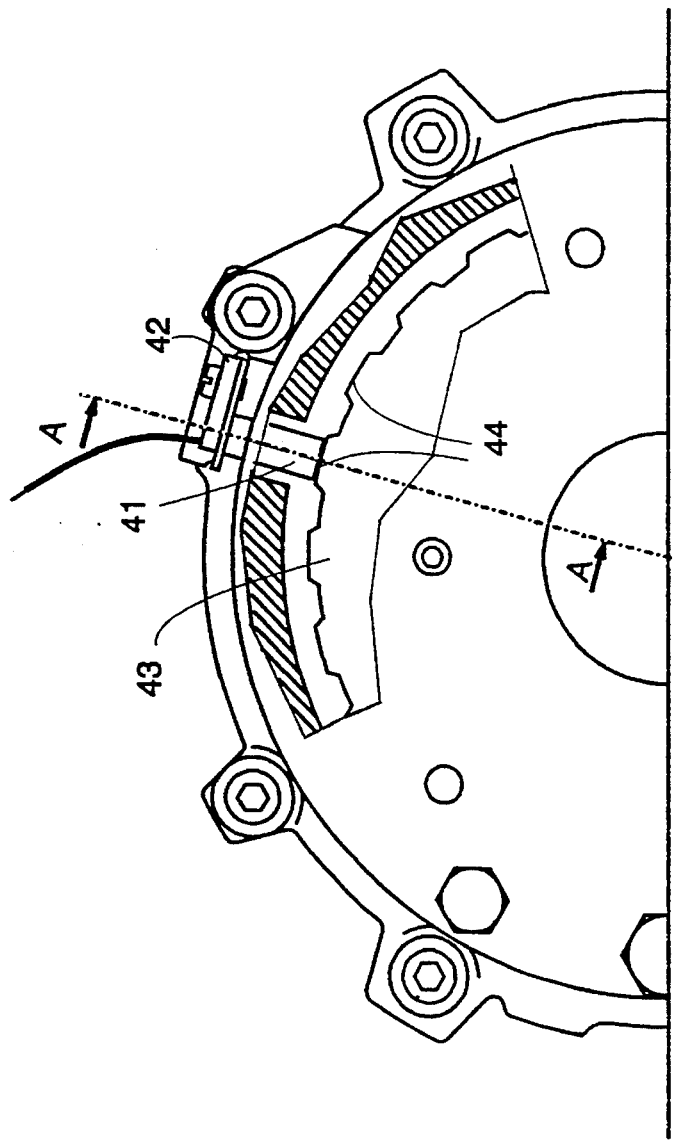

FIG. 4a shows how the pulse sensor is mounted on the motor. The inductive sensor 41 is attached with a fixing element 42 to the body of a brake installed at the end of the motor. The brake wheel 43 is provided with a toothing 44 and the sensor is fitted in the immediate vicinity of the teeth.

FIG. 4b presents a section through FIG. 4a along line A–A.

The invention has been described above by the aid of one of its preferred embodiments. However, the presentation is not to be regarded as limiting the sphere of protection of the invention, but the embodiments of the invention may vary within the limits defined by the following claims.

I claim:

1. A method for adjusting the speed of an induction motor comprising the steps of:

(a) providing a first speed reference signal for the motor;

(b) producing a second reference signal based on the first speed reference signal;

(c) producing at least one motor supply signal based on the second reference signal;

(d) supplying the at least one motor supply signal to the motor;

(e) converting the second reference signal to a third speed reference signal having a voltage proportional to a synchronous speed of the motor;

(f) producing a speed frequency signal having a frequency proportional to the synchronous speed of the motor, based on the third speed reference signal;

(g) providing a motor frequency signal having a frequency proportional to the actual speed of the motor;

(h) producing a correction signal proportional to a slip of the motor, based on the motor frequency signal of said step (g) and the speed frequency signal of said step (f); and (i) correcting the second reference signal of said step (b) based on the correction signal of said step (g).

2. The method according to claim 1, wherein the motor frequency signal and the speed frequency signal are pulse signals, and the value of the correction signal is based on a phase difference between the motor frequency signal and the speed frequency signal.

3. The method according to claim 1, wherein said step (h) further includes the steps of:

(h1) calculating a phase difference between the motor frequency signal of said step (g) and the speed frequency signal of said step (f); and (h2) integrating the calculated phase difference of said step (h1) to produce the correction signal.

4. The method according to claim 3, wherein said steps (f) and (h1) are performed by a phase locked loop.

5. The method according to claim 1, wherein said step (h) further includes the steps of:

(h1) producing a phase difference pulse signal based on a phase difference between the motor frequency signal of said step (g) and the speed frequency signal of said step (f);

(h2) subtracting the phase difference pulse signal of said step (h1) from the third speed reference signal of said step (e); and (h3) filtering the phase difference pulse signal of said step (h1) to produce the correction signal;

and wherein said step (f) further includes the step of:

(f1) producing the speed frequency signal based on the third speed reference signal of said step (e) as modified by the subtraction step of step (h2).

6. The method according to claim 5, wherein said step (h3) includes integrating the phase difference pulse signal to produce the correction signal.

7. The method according to claim 1, wherein the motor frequency signal of said step (g) is produced by a pulse tachometer or a pulse sensor.

8. The method according to claim 1, wherein said step (i) further includes the step of adding the correction signal to the first speed reference signal to thereby correct the second reference signal.

9. The method according to claim 1, wherein said step (e) further includes the step of dividing the second reference signal by the number of pole pairs to thereby produce the third speed reference signal.

10. The method according to claim 1, wherein said step (f) further includes:

(f1) inputting the third speed reference signal into a voltage controlled oscillator; and (f2) outputting from the voltage controlled oscillator the speed frequency signal.

11. The method according to claim 1, wherein the third speed reference signal has a voltage proportional to a frequency of one of the at least one motor supply signal.

12. The method according to claim 1, wherein the first speed reference signal, the second reference signal, the third speed reference signal, and the correction signal are voltage signals;

and wherein the speed frequency signal and the motor frequency signal are frequency signals.

13. An apparatus for adjusting the speed of an induction machine comprising:

a sensor for generating a motor frequency signal proportional to the actual speed of the machine;

controller means for producing a speed reference signal having a voltage proportional to a synchronous speed of the machine;

an oscillator for generating a speed frequency signal having a frequency proportional to the synchronous speed of the motor, based on the speed reference signal;

a phase comparator for determining a phase difference between the motor frequency signal and the speed frequency signal, and for producing a phase difference pulse signal;

correcting means for correcting the speed reference signal based on the phase difference pulse signal;

filtering means for filtering the phase difference pulse signal to produce a correction signal proportional to a slip of the machine;

wherein said controller means corrects the speed reference signal based on the correction signal.

14. The apparatus according to claim 13, wherein the machine is a motor.

15. The apparatus according to claim 14, wherein said motor includes a brake wheel having a body and toothing, and wherein said sensor includes an inductive sensor attached to the body and responsive to said toothing.

16. The apparatus according to claim 13, wherein said phase difference pulse signal is a three-state signal.

17. The apparatus according to claim 13, wherein the filtering means includes an integrator for integrating the phase difference pulse signal to produce the correction signal.

18. The apparatus according to claim 13, wherein said oscillator outputs only a single signal, said single signal being the speed frequency signal.

19. The apparatus according to claim 13, wherein the correcting means includes a summing element which subtracts the phase difference pulse signal from the speed reference signal.

* * * * *